United States Patent
Stock et al.

(10) Patent No.: US 6,316,041 B1
(45) Date of Patent: Nov. 13, 2001

(54) POULTRY EGG WITH BENEFICIAL HEALTH AND NUTRITIVE VALUES

(75) Inventors: Robert H. Stock, Manlius, NY (US); James D. Compton, Malvern, PA (US)

(73) Assignee: LifeRight Foods, L.L.C., Princeton, NJ (US)

( * ) Notice: Subject to any disclaimer, the term of this patent is extended or adjusted under 35 U.S.C. 154(b) by 0 days.

(21) Appl. No.: 09/427,297

(22) Filed: Oct. 26, 1999

(51) Int. Cl.[7] ............................ A23L 1/32; A23K 1/18; A23K 1/24
(52) U.S. Cl. ........................... 426/614; 426/2; 426/807
(58) Field of Search ................... 426/614, 2, 807

(56) References Cited

U.S. PATENT DOCUMENTS

| | | |
|---|---|---|
| 4,128,640 | 12/1978 | Klein . |
| 4,187,294 | 2/1980 | Ishikawa et al. . |
| 4,197,293 | 4/1980 | Klein . |
| 4,197,294 | 4/1980 | Klein . |
| 4,394,376 | 7/1983 | Kamimae et al. . |
| 4,410,541 | 10/1983 | Kamimae et al. . |
| 4,738,853 | 4/1988 | Horrobin . |
| 4,764,531 | 8/1988 | Nissen . |
| 4,918,104 | * 4/1990 | Weiss et al. . |
| 5,012,761 | 5/1991 | Oh . |
| 5,091,195 | 2/1992 | Havens . |
| 5,246,717 | 9/1993 | Garwin . |
| 5,415,879 | 5/1995 | Oh . |
| 5,520,938 | 5/1996 | Brunnquell . |
| 5,665,375 | 9/1997 | Meier et al. . |
| 5,759,567 | 6/1998 | Meier et al. . |
| 5,897,890 | * 4/1999 | Scheideler . |
| 6,103,276 | * 8/2000 | Pilgrim et al. . |

FOREIGN PATENT DOCUMENTS

578266 * 1/1994 (EP) .

OTHER PUBLICATIONS

Database Abstract. Derwent–Acc–No: 1995–271401. For JP 2451519. Patent Assignee: IIDAI.*
Database Abstract. Derwent–Acc–No: 1977–39095Y. For JP 52050881. Patent Assignee: TOYJ.*
Database Abstract. Derwent–Acc–No: 11994–134046. For TW 221372. Inventor: Lin, 1994.*

* cited by examiner

Primary Examiner—Anthony J. Weier
(74) Attorney, Agent, or Firm—Watov & Kipnes, P.C.

(57) ABSTRACT

This invention provides a modified egg with enhanced health and nutritive values for human consumption. The modified egg contains less cholesterol and saturated fat, and contains a beneficial content of omega-3 unsaturated fatty acid. In another embodiment this invention provides a poultry feed for production of modified eggs in accordance with the present invention. The poultry feed ingredients include a cholesterol-lowering agent, and omega-3 unsaturated fatty acid.

12 Claims, No Drawings

POULTRY EGG WITH BENEFICIAL HEALTH AND NUTRITIVE VALUES

BACKGROUND OF THE INVENTION

This invention generally relates to poultry eggs which are produced for human consumption. More specifically this invention relates to a method for the production of modified eggs having enhanced health and nutritive benefits.

There is increasing interest in the concept of "functional foods", which the FDA defines as foods that by virtue of physiologically active components provide benefits beyond basic nutrition and may prevent disease and promote health. Because of a demographic trend to an increasing senior population, there is a tending urgency for the development of functional foods to subserve a healthier lifestyle.

With respect to food commodities, chicken eggs are recognized as an excellent source of dietary protein. Recently, concern over the high incidence of heart disease in developed countries has led to the identification of risk factors involved in heart disease.

It is generally accepted that high levels of saturated lipids and cholesterol in the human diet increase the risk of cardiovascular disease, such as atherosclerosis, myocardial infarction, and hypertension.

The medical community has recommended ingestion of polyunsaturated fatty acids for the purpose of reducing the risk of coronary heart disease.

Plant polyunsaturated oils contain omega-6 fatty acids such as linoleic acid which provide some limited dietary benefits. Fish oils contain substantial omega-3 fatty acids such as eicosapentaenoic acid and docosahexaenoic acid, and it has been determined that fish oils significantly reduce the likelihood of cardiovascular disease when included in a dietary regimen. Omega-3 polyunsaturated fatty acids also have been linked to a reduction in cholesterol level in blood serum.

Because persons with an elevated blood cholesterol level statistically have an increased risk of coronary heart disease, medical practitioners recommend a reduced dietary intake of cholesterol. Since chicken eggs have a high content of cholesterol (typically between 213–280 milligrams), health advisors recommend limiting or eliminating eggs from the diet of persons having a high blood cholesterol level.

The elimination of chicken eggs as a food source is a disadvantage, since eggs represent a convenient low-cost source of protein and minerals and other nutrients in a highly digestible form.

Research has been conducted in an effort to develop a poultry egg which has reduced quantities of cholesterol and saturated fatty acids. The methods reported for reduction of the cholesterol and saturated fatty acid content of poultry eggs generally have been unsatisfactory. These methods are reported in technical publications which include U.S. Pat. Nos. 4,128,640; 4,187,294; 4,197,293; 4,197,294; 4,394,376; 4,410,541; 4,738,853; 4,764,531; 5,012,761; 5,091,195; 5,246,717; 5,415,879; 5,520,938; 5,665,375; and 5,759,567; incorporated herein by reference.

There is active interest in the research and development of new and effective methods for modifying poultry eggs to qualify them for modern dietary protocols.

Accordingly, it is an object of this invention to provide a method for producing modified eggs with beneficial health and nutritive values.

It is another object of this invention to provide a poultry feed for egg-laying hens for the production of eggs with a reduced cholesterol and saturated fatty acid content.

It is another object of this invention to provide a modified poultry egg with a lower saturated/unsaturated fatty acid ratio.

It is another object of this invention to provide a modified poultry egg with a content of omega-3 unsaturated fatty acid.

It is a further object of this invention to provide a modified poultry egg with a reduced total fatty acid content.

Other objects and advantages of the present invention shall become apparent from the accompanying description and examples.

DESCRIPTION OF THE INVENTION

One of more objects of the present invention are accomplished by the provision of a modified egg with enhanced health and nutritive values for human consumption, wherein the modified egg is a whole shell poultry egg having a content of constituents comprising less than about 160 milligrams of cholesterol per 50 grams of edible egg, less than about 1.2 grams of saturated fatty acid per 50 grams of edible egg, at least about 70 milligrams of total omega-3 unsaturated fatty acid per 50 grams of edible egg, between about 0–300 milligrams of docosahexaenoic acid per 50 grams of edible egg, and between about 0–10 milligrams of conjugated linoleic acid per 50 grams of edible egg.

The term "poultry" as employed herein refers in particular to an egg-laying chicken hen, and in general to avian species which include turkey, duck, goose, pigeon, guinea fowl, peafowl, quail, pheasant, chukar, partidge, grouse, emu, rhea and ostrich.

The term "fatty acid" as employed herein refers to fatty acid in the free form, and fatty acid which is in the form of esters such as triglycerides, and fatty acid which is the form of salts such as alkali metal derivatives.

The term "edible egg" as employed herein refers to the liquid contents of a whole poultry egg which is de-shelled.

Commercial chicken shell eggs consists of 8–11% shell, 56–61% albumen, and 27–32% yolk. De-shelled whole egg is about 36% yolk and 64% albumen.

The composition of albumen, yolk and whole egg is described in Chapter 6 of "Egg Science & Technology" (Second Edition, Avi Publishing Company, 1977).

| Egg | % Protein | % Lipid |
|---|---|---|
| Albumen | 9.7–10.6 | 0.03 |
| Yolk | 15.7–16.6 | 31.8–35.5 |
| Whole Egg | 12.8–13.4 | 10.5–11.8 |

The composition of yolk lipid is 65.5% triglyceride, 28.3% phospholipid and 5.2% cholesterol. The yolk phospholipid is composed of about 73% phosphatidylcholine, 15% phosphatidylethanolamine, 5.8% lysophosphatidylcholine, 2.5% sphinogomyelin, 2.1% lysophosphatidylethanolamine, 0.9% plasmalogen and 0.6% inositol phospholipid.

The yolk of an average chicken shell egg contains a distribution of saturated and unsaturated fatty acid. A "C 16:1" designation refers to a fatty acid with 16 carbon atoms and one double bond.

| Yolk Fatty Acid | % of Total Fatty Acids |
| --- | --- |
| C 16:0 | 23.5 |
| C 16:1 | 3.8 |
| C 18:0 | 14.0 |
| C 18:1 | 38.4 |
| C 18:2 | 16.4 |
| C 18:3 | 1.4 |
| C 20:4 | 1.3 |
| C 20:5 | 0.4 |
| C 22.5 | 0.4 |
| C 22:6 | 0.8 |

Fatty acids are numbered from the carboxylic carbon atom. The position of double bonds is indicated by the greek letter delta ($\Delta$) followed by the carbon number of the double bond, i.e., C 20:5 omega-3 $\Delta^{5,8,11,14,17}$. The omega ($\omega$) notation refers to the position of a double bond as an indicated number of carbon atoms from the terminal end of an unsaturated fatty acid. The designation for eicosapentaenoic acid, an omega-3 polyunsaturated fatty acid, is C 20:5 $\omega$-3 $\Delta^{5,8,11,14,17}$. Docosapentaenoic acid is C 22:5 $\omega$-3 $\Delta^{7,10,13,16,19}$ and docosahexaenoic acid is C 22:6 $\omega$-3 $\Delta^{4,7,10,13,16,19}$. The designation omega-6 ($\omega$-6) refers to a fatty acid such as linoleic acid that has a double bond which is at carbon position six from the terminal end of the fatty acid.

A present invention modified egg provides health and nutritive benefits in comparison with a commercial product such as chicken eggs. A present invention modified egg typically has a content, per 50 grams of edible egg, of between about 106–160 milligrams of cholesterol, between about 0.8–1.2 grams of saturated fatty acid, between about 70–400 milligrams of total omega-3 unsaturated fatty acid, between about 5–300 milligrams of docosahexaenoic acid, between about 1–10 milligrams of conjugated linoleic acid, between about 0.5–10 milligrams of vitamin E, between about 10–150 micrograms of folate (folic acid), and between about 1–120 micrograms of iodine. Optionally, a present invention modified egg can have a yolk Roche Color Scale value between about 8–15.

In a preferred embodiment, a present invention poultry egg contains less than about 1.2 grams of saturated fatty acid and at least about 2 grams of unsaturated fatty acid per 50 grams of edible egg, and an effective quantity of antioxidant.

Suitable antioxidants are illustrated by vitamin E and ethoxyquin.

In another embodiment this invention provides a poultry feed for production of eggs with enhanced health and nutritive values for human consumption, wherein the feed for egg-laying hens has a supplemented content comprising (1) between about 0.01–10 grams of cholesterol-lowering agent per feed kilogram; (2) between about 1.4–8 grams of total omega-3 unsaturated fatty acid per feed kilogram; (3) between about 0–6 grams of decosahexaenoic acid per feed kilogram; (4) between about 0–100 milligrams of conjugated linoleic acid per feed kilogram; (5) between about 0–400 milligrams of vitamin E per feed kilogram; (6) between about 0–250 micrograms of folate per feed kilogram; (7) between about 0–400 micrograms of iodine derivative per feed kilogram; and (8) between about 040 milligrams of carotenoid pigment per feed kilogram.

Conventional feeds for egg-laying hens are extensively detailed in publications which include "Commercial Poultry Nutrition" (Second Edition, University Books, 1997), "Feeds & Nutrition" (Second Edition, Ensminger Publishing Company, 1990), and "Livestock Feeds & Feeding" (Fourth Edition, Prentice Hall, 1998); incorporated by reference.

Omega-6 fatty acids are the main unsaturated fatty acids found in plants and animals. Omega-3 unsaturated fatty acids are commercially available in certain fish oils which can contain up to 20–30% of omega-3 unsaturated fatty acids. A preferred poultry feed contains between about 0.7–6 grams of docosahexaenoic acid (omega-3) per feed 20 kilogram.

Table A illustrates the fatty acid profile of available fat and oil sources.

TABLE A

| | % of Total Fatty Acids | | | | |
| --- | --- | --- | --- | --- | --- |
| Fatty Acid Source | C 16:0 | C 18:0 | C 18:1 | C 18:2 | C 18:3 |
| Soy | 11 | 4 | 23 | 54 | 8 |
| Peanut | 12 | 3 | 55–60 | 25–40 | 1 |
| Palm | 35–45 | 4 | 35–50 | 5–10 | 1 |
| Sunflower | 3–10 | 1 | 15–25 | 60–70 | 1 |
| Corn | 9 | 5 | 35–45 | 35–50 | 1 |
| Safflower | 2–10 | 1–10 | 7–40 | 55–80 | 1 |
| Canola | 5 | 2 | 48–60 | 18–22 | 10 |
| Cotton | 22 | 2 | 17 | 56 | 1 |
| Tallow | 24 | 19 | 43 | 3 | 1 |
| Lard | 26 | 14 | 44 | 10 | 1 |

An important aspect of the present invention is the inclusion of a cholesterol-lowering agent in poultry feed. Suitable cholesterol-lowering agents for poultry feeds include tall oil phytosterol extract, canola oil phytosterol extract, soy oil phytosterol extract, Monascus Red Yeast Rice, copper citrate, copper sulfate, copper proteinate, and the like.

Phytosterols are illustrated by β-sitosterol, β-sitostanol, campesterol, campestanol, stigmasterol, brassicasterol, brassicastanol, and the like. Phytosterols are derived mainly from the Kraft wood pulp processing industry. During the process, floating lipid material is skimmed off as tall oil soap. This water byproduct contains a high level of phytosterols.

It has been reported in the medical literature that dietary phytosterol consumption by humans has been shown to reduce serum cholesterol by inhibiting the absorption of cholesterol in the small intestine. Pertinent publications include New England Journal of Medicine, 333 (20), 1308 (1995); Can. J. Physiol. Pharmacol., 75 (3), 217 (1997); and U.S. Pat. No. 5,502,045; incorporated by reference.

An optional aspect of the present invention is the inclusion of conjugated linoleic acid in poultry feed. Conjugated linoleic acid is the only fatty acid shown unequivocally to inhibit carcinogenesis in experimental animals [J. Nutr., 127, 1055 (1997)].

The present invention further contemplates the use of a copper derivative in a quantity between about 10–300 milligrams of copper derivative per feed kilogram, either alone or in combination with another active ingredient as a cholesterol-lowering additive for poultry feed. A combination cholesterol-lowering additive is illustrated by an admixture of phytosterol and copper derivative.

The use of cupric sulfate pentahydrate in poultry feed to lower the cholesterol content in chicken shell eggs is reported in British Poultry Science, 39, 393 (1998).

There are additional health and nutritive benefits with eggs for human consumption which include iodine and iron minerals.

An iodine derivative can be added to poultry feed in the form of calcium iodide, calcium iodate, potassium iodide, sodium iodide, cuprous iodide, thymol iodide, ethylenediamine dihydriodide, and the like. In publications such as U.S. Pat. Nos. 4,187,294 and 5,246,717, it has been reported that an iodine content in eggs lowers the serum cholesterol of hypercholesterolemic individuals.

As an additional feature, a present invention feed can have a content of carotenoid pigments such an xantophylls for the purpose of increasing the Roche Color Scale value of shell egg yolk for consumer appeal. Xantophylls are found in alfalfa meal, corn gluten meal, and marigold petals. Gluten meal contains up to 300 milligrams of xantophylls per kilogram. Xantophyll compounds include zeaxanthin, canthaxanthin, astaxantin, and the like.

Other additives can be incorporated in a present invention poultry feed, such as proteins, minerals, vitamins, antibiotics, antifungal agents, flavors, grits and the like.

The following examples are further illustrative of the present invention. The components and specific ingredients are presented as being typical, and various modifications can be derived in view of the foregoing disclosure within the scope of the invention.

EXAMPLE I

This Example illustrates the production of modified poultry eggs with a lowered content of cholesterol in accordance with the present invention.

Four hundred and fifty Hyline W-36 white leghorn hens, 29 weeks of age are fed a commercial laying hen diet. After 4 weeks on the commercial diet they are assigned at random to experimental treatments. The composition of the basal experimental diet is listed in Table 1, and the analysis is summarized in Table 2.

For each experimental treatment, a 2-pound premix containing the test ingredient and canola meal is prepared. This 2-pound premix is then mixed with 118 pounds of the basal diet to obtain the experimental diet. After approximately 4 weeks on the experimental diets the eggs are analyzed for cholesterol, and the results are as summarized in Table 3.

There are no differences in body weight of the birds, egg production or egg weight between the treatments. All of the experimental treatments lower the cholesterol content of the eggs. The experimental diets all contain 4% canola oil and 7% canola meal, and the use of these ingredients lowers the cholesterol from 215.2 to 183.7 mg per 50 g of edible egg. Analysis of the feed indicates that the combination of 4% canola oil and 7% canola meal in the feed added approximately 0.15 gram of phytosterols per Kg of feed. An increase of phytosterols in the diet decreases the cholesterol further. The optimum level of phytosterol addition is in the range of 0.16 to 0.63 gram of added phytosterols per Kg of feed. Together with the phytosterols supplied by the canola oil and meal, the optimal level of total supplementation is between 0.31 and 0.78 gram of phytosterol per Kg of feed. With this level of supplementation, the trial feed contains between 0.79 and 1.26 grams of total phytosterols per Kg of feed.

The cholesterol level decreases with increasing levels of Monascus Red Yeast Rice up to 3.75 grams per Kg of feed, and then begins to increase again. The data indicate that the optimal level of supplement for this type of Monascus Red Yeast Rice is between 2.50 and 5.0 grams per Kg of feed. There are different varieties of Monascus Red Yeast Rice, so that the optimal cholesterol reduction with this supplement will vary with the particular variety and source.

The data in Table 3 further indicate that copper citrate is effective in lowering the cholesterol content of the collected trial eggs. Cholesterol levels decrease as the quantity of copper derivative increases. It has been observed that above levels of about one gram of copper citrate per feed kilogram, the rate of cholesterol reduction declines. Feeding high levels of copper derivative to laying hens for prolonged periods is detrimental to performance, so that high levels of copper derivative in a poultry feed is not an economical means of reducing the cholesterol content of modified poultry eggs.

With respect to the Table 3 trial results, the maximum cholesterol reduction is obtained with a combination of phytosterols, Monascus Red Yeast Rice, copper, canola meal and canola oil.

TABLE 1

| Ingredient | Weight % |
| --- | --- |
| Corn Meal | 55.76 |
| Soybean Meal | 21.82 |
| Limestone | 8.85 |
| Canola Meal | 7.0 |
| Canola Oil | 4.0 |
| Dicalcium Phosphate | 1.72 |
| Salt | 0.55 |
| DL-Methionine | 0.15 |
| Vitamin Mix | .075 |
| Mineral Mix | .075 |

TABLE 2

| Nutrient | Calculated Analysis | Laboratory Analysis |
| --- | --- | --- |
| Protein % | 17.5 | 18.8 |
| Crude Fat % | 6.13 | 5.65 |
| Fiber % | 2.68 | 3.45 |
| Calcium % | 3.85 | 3.90 |
| Total Phosphorus % | .68 | .80 |
| Sodium % | .22 | .20 |
| Copper ppm | 10 | 12 |
| Metabolizable Energy (KCal/LB) | 1342 | |
| Lysine % | .96 | |
| Methionine + Cystine % | .78 | |
| Available Phosphorus % | .45 | |

TABLE 3

| | Grams per Kg Feed | Cholesterol per 50 g of edible egg |
| --- | --- | --- |
| Commercial diet | | 215.2 mg |
| 7% Canola Meal & 4% Canola Oil | | 183.7 mg |
| Monascus Red Yeast Rice[(1)(1)] | 0.5 | 174.9 mg |
| | 1.25 | 174.4 mg |
| | 2.5 | 157.3 mg |
| | 3.75 | 152.1 mg |
| | 5.0 | 162.2 mg |
| | 7.5 | 167.4 mg |
| | 10 | 168.4 mg |
| | 20 | 162.6 mg |
| Phytosterols[(2)] | 0.16 | 165.6 mg |
| | 0.31 | 165.2 mg |
| | 0.63 | 175.7 mg |
| | 1.56 | 165.8 mg |
| | 3.13 | 176.3 mg |
| | 5.29 | 168.4 mg |
| Copper Citrate | 0.09 | 178.6 mg |
| | 0.19 | 174.3 mg |

TABLE 3-continued

| | Grams per Kg Feed | Cholesterol per 50 g of edible egg |
|---|---|---|
| | 0.38 | 170.2 mg |
| | 0.76 | 167.3 mg |
| Combination[3] | | 152.0 mg |

[1]Chinese Red Yeast Rice Powder. Allok GmbH, Munich, Germany
[2]"Sitosterol" Xiangfan Cereals, Oils & Foodstuffs 1/E Co, Huber, China. Beta-Sitosterol (31.7%), Camperterol (19.2%), and Stigmasterol (10.4%).
[2]"Sitosterol". Xiangfan Cereals, Oils & Foodstuffs 1/E Co, Hubei, China. Beta-Sitosterol (31.7%), Campesterol (19.2%), and Stigmasterol (10.4%). Beta-Sitosterol (31.7%), Camperterol (19.2%), and Stigmasterol (10.4%).
[3]10 g, Monascus Red Yeast Rice, 4.17 g phytosterols, 0.38 g copper citrate, per kilogram of feed.

EXAMPLE II

This Example further illustrates the production of modified poultry eggs with a lowered content of cholesterol in accordance with the present invention.

Following the procedure of Example I, four hundred and fifty Hyline W-36 white leghorn hens, 43 weeks of age, are fed a commercial laying hen diet. After 4 weeks on the commercial diet they are assigned at random to experimental treatments. The composition of the basal experimental diet is listed in Table 4, and the analysis in summarized in Table 5.

For each experimental treatment, a 1-pound premix containing the test ingredient and canola meal is prepared. This 1-pound premix is then mixed with 139 pounds of the basal diet to obtain the experimental diet. After approximately 4 weeks on the experimental diets the eggs are analyzed for cholesterol, and the results are as summarized in Table 6.

There are no differences in body weight of the birds, egg production or egg weight between the treatments. All of the experimental treatments lower the cholesterol content of the eggs. The experimental diets all contain 5% canola meal, and the use of canola meal lowers the cholesterol from 215.2 to 197.1 mg per 50 g of edible egg.

Two different sources of phytosterols are tested, and both give similar results with the level of cholesterol being reduced from 197.1 mg to around 185 mg per 50 g of edible egg. Varying the levels of added phytosterols from 0.13 to 1.41 grams per Kg of feed does not change the amount of cholesterol reduction under the trial conditions. However, Example I shows that the cholesterol level decreases as the level of phytosterols increases up to .78 grams per Kg of diet. It appears that the inclusion of an animal/vegetable fat blend in the diet limits the effectiveness of the phytosterols under these trial conditions.

The cholesterol level decreases from 197.1 to 183.4 mg per 50 grams of edible egg with the inclusion of Monascus Red Yeast Rice at 2.2 grams per Kg of feed. The magnitude of the decrease in cholesterol is not as great as demonstrated in Example I. This is due to the use of a different variety of Monascus Red Yeast Rice in this trial.

The data in Table 6 further indicate that copper sulfate is effective in lowering the cholesterol content of the collected trial eggs. Cholesterol levels decrease from 197.1 to 185.6 and 176.9 mg per 50 grams of edible egg as the quantity of copper increases. Feeding high levels of copper derivative to laying hens for prolonged periods is detrimental to performance, so that high levels of copper in a poultry feed is not an economical means of reducing the cholesterol content of modified poultry eggs.

The maximum cholesterol reduction is achieved with a combination of phytosterols, Monascus Red Yeast Rice, copper sulfate and canola meal. With this combination of ingredients average cholesterol levels of 145–158 mg per 50 grams of edible egg are obtained.

TABLE 4

| Ingredient | Weight % |
|---|---|
| Corn Meal | 56.343 |
| Soybean Meal 48% | 21.7 |
| Limestone | 9.1 |
| Canola Meal | 5.0 |
| AV Fat Blend | 3.0 |
| Alfalfa 17% | 2.5 |
| Dicalcium Phosphate | 1.57 |
| Salt | 0.28 |
| DL-Methionine | 0.21 |
| Sodium Bicarbonate | 0.20 |
| Vitamin Mix | .025 |
| Mineral Mix | .075 |

TABLE 5

| Nutrient | Calculated Analysis | Laboratory Analysis |
|---|---|---|
| Protein % | 17.3 | 17.6 |
| Crude Fat % | 5.3 | 5.5 |
| Fiber % | 3.46 | 3.36 |
| Calcium % | 3.85 | 3.94 |
| Total Phosphorus % | .74 | .72 |
| Sodium % | .18 | .21 |
| Copper ppm | 10 | 15 |
| Metabolizable Energy (Kcal/LB) | 1280 | |
| Lysine % | .90 | |
| Methionine + Cystine % | .78 | |
| Available Phosphorus % | .45 | |

TABLE 6

| | Grams per Kg Feed | Cholesterol per 50 g of edible egg |
|---|---|---|
| Commercial diet | | 215.2 mg |
| 5% Canola Meal | | 197.1 mg |
| Monascus Red Yeast Rice[1] | 2.2 | 183.4 mg |
| Phytosterols | | |
| Fytosterol[2] | 0.13 | 185.5 mg |
| | 0.24 | 184.9 mg |
| Fytokem Natural Blend #10[3] | 0.71 | 184.5 mg |
| | 1.41 | 184.6 mg |
| Copper Sulfate | 0.23 | 185.6 mg |
| | 0.45 | 176.9 mg |
| Combination[4] | | 150.0 mg |

[1]Chinese Red Yeast Rice Powder. Allok GmbH, Munich, Germany
[2]"Fytosterol". Fytokem Products Inc., Saskatoon, SK S7N 3R3, Canada, Beta-Sitosterol (40–50%), Campesterol (20–30%), and Brassicasterol (20–30%)
[3]"Fytokem Natural Blend #10". Fytokem Products Inc., Saskatoon, SK S7N 3R3, Canada, Beta-Sitosterol (6.5–8%), Campesterol (3–5%), and Brassicasterol (3–5%)
[4]2.2 g, Monascus Red Yeast Rice, 1.41 g Fytokem Natural Blend #10, 0.23 g copper sulfate, per kilogram of feed.

EXAMPLE III

This example illustrates the production of modified poultry eggs with a lowered content of cholesterol and beneficial nutritive values in accordance with the present invention.

The trial procedure of Example I is followed with a supplemented hen diet having the composition listed in Table 7.

The phytosterols and Monascus Red Yeast Rice sources are as described in Example 1. The total content of cholesterol lowering agent in the feed diet is about 8 grams per kilogram of diet. The docosahexaenoic acid can be supplemented in the diet from many different sources, including algae, fish meal, fish oil and krill. Flaxseed while it does not contain docosahexaenoic acid does stimulate the natural biological pathways in poultry to produce docosahexaenoic acid. The collected eggs have the average ingredient contents listed in Table 8.

Repeated trials yield modified eggs which have an ingredient content in the ranges comprising, 106–160 milligrams of cholesterol, 0.8–1.2 grams of saturated fatty acids, 5–300 milligrams of docosahexaenoic acid, 1–10 milligrams of conjugated linoleic acid, 0.5–10 milligrams of Vitamin E, 10–150 micrograms of folate and 1–120 micrograms of iodine, per 50 grams of edible egg respectively, and a Yolk Roche Color Scale Value of 8–15.

TABLE 7

| Ingredient | Weight % |
| --- | --- |
| Corn Meal | 51.86 |
| Soybean Meal | 19.82 |
| Flaxseed | 5.00 |
| Limestone | 8.85 |
| Canola Meal | 7.0 |
| Canola Oil | 4.0 |
| Dicalcium Phosphate | 1.72 |
| Additive* | 0.9 |
| Salt | 0.55 |
| DL-Methionine | 0.15 |
| Vitamin Mix | .075 |
| Mineral Mix | .075 |

*Additive provides 4 grams of Monascus Red Yeast Rice, 3 grams of phytosterols, 0.5 grams of copper sulfate, 80 milligrams of conjugated linoleic acid, 300 mg of Vitamin E, 250 micrograms of folate, and 155 micrograms of calcium iodate per kilogram of feed

TABLE 8

|  | Per 50 g edible egg |
| --- | --- |
| Cholesterol | 148 mg |
| Saturated Fatty Acids | 0.9 g |
| Docosahexaenoic Acid | 80 mg |
| Conjugated Linoleic Acid | 8 mg |
| Vitamin E | 7.5 mg |
| Folate | 100 µg |
| Iodine | 40 µg |
| Yolk Roche Color Value | 10 |

What is claimed is:

1. A modified egg with enhanced health and nutritive values for human consumption, wherein the modified egg is a whole shell poultry egg having a content of constituents comprising 106 to 160 milligrams of cholesterol, 0.8 to 1.2 grams of saturated fatty acids, 5 to 300 milligrams of docosahexaenoic acid, 1 to 10 milligrams of conjugated linoleic acid, 0.5 to 10 milligrams of vitamin E, 10 to 150 micrograms of folate and 1 to 120 micrograms of iodine, all of the amounts of said constituents based on 50 grams of edible egg, and said modified egg having a Yolk Roche Color Scale Value of 8 to 15.

2. A modified egg in accordance with claim 1 which is a chicken egg.

3. A modified egg in accordance with claim 1 which is a turkey egg.

4. A modified egg in accordance with claim 1 which is a duck egg.

5. A modified egg in accordance with claim 1 which is a goose egg.

6. A modified egg in accordance with claim 1 which is in a de-shelled edible egg form.

7. A poultry feed for production of eggs with enhanced health and nutritive values for human consumption wherein the feed for egg-laying hens has a supplemented content comprising (1) between about 0.01 to 10 grams of a cholesterol-lowering agent, (2) between about 1.4 to 8 grams of total omega-3 unsaturated fatty acid, (3) docosahexaenoic acid in an amount up to 6 grams, (4) conjugated linoleic acid in an amount up to 100 milligrams, (5) vitamin E in an amount up to 400 milligrams, (6) folate in an amount up to 250 micrograms, (7) iodine derivative in an amount up to 400 micrograms, (8) carotenoid pigment in an amount up to 40 milligrams and a cholesterol reducing effective amount of a cholesterol reducing agent comprising the combination of a phytosterol and Monascus Red Yeast Rice, each of said amounts based on 1 kilogram of said poultry feed.

8. A poultry feed in accordance with claim 7 wherein the phytosterol is in a form selected from the group consisting of tall oil phytosterol extract, canola oil phytosterol extract, soy oil phytosterol extract and mixtures thereof.

9. A poultry feed in accordance with claim 7 wherein the phytosterol is selected from the group consisting of β-sitosterol, β-sitostanol, campesterol, campestanol, stigmasterol, brassicasterol, brassicastanol, and mixtures thereof.

10. A poultry feed in accordance with claim 7 wherein the cholesterol-lowering agent is the combination of phytosterol, Monascus Red Yeast Rice and a copper derivative.

11. A method of producing a modified egg with enhanced health and nutritive values which comprises feeding egg-laying hens with an effective per diem quantity of poultry feed in accordance with claim 7.

12. A modified egg produced in accordance with the method of claim 11.

* * * * *